No. 880,878. PATENTED MAR. 3, 1908.
E. & G. HAGSTROM.
IMPLEMENT FOR SEVERING BRITTLE SUBSTANCES.
APPLICATION FILED APR. 11, 1906.
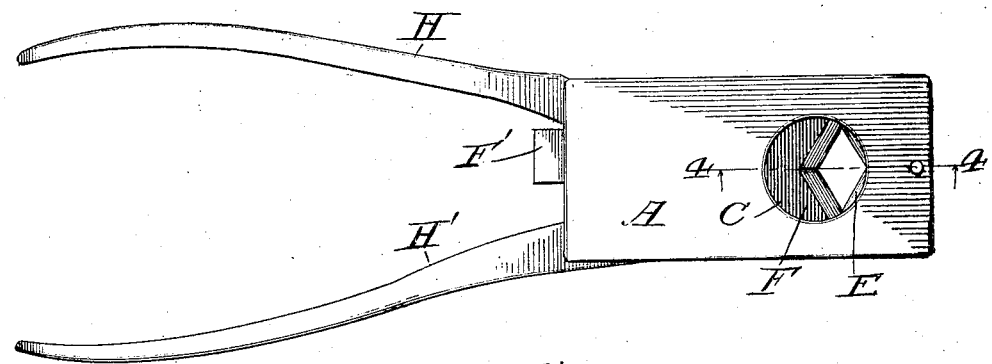
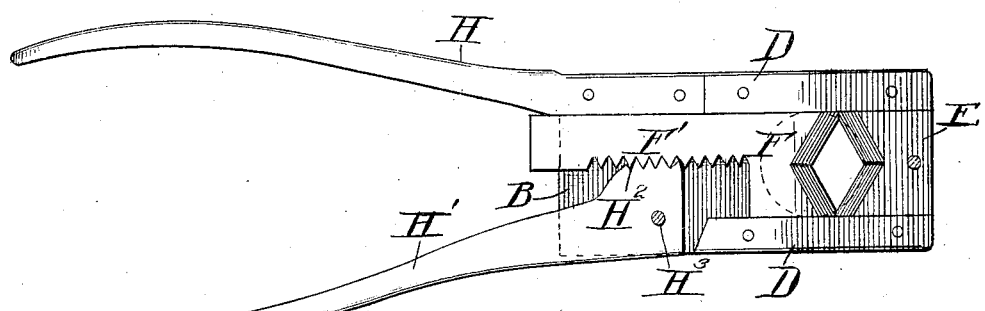
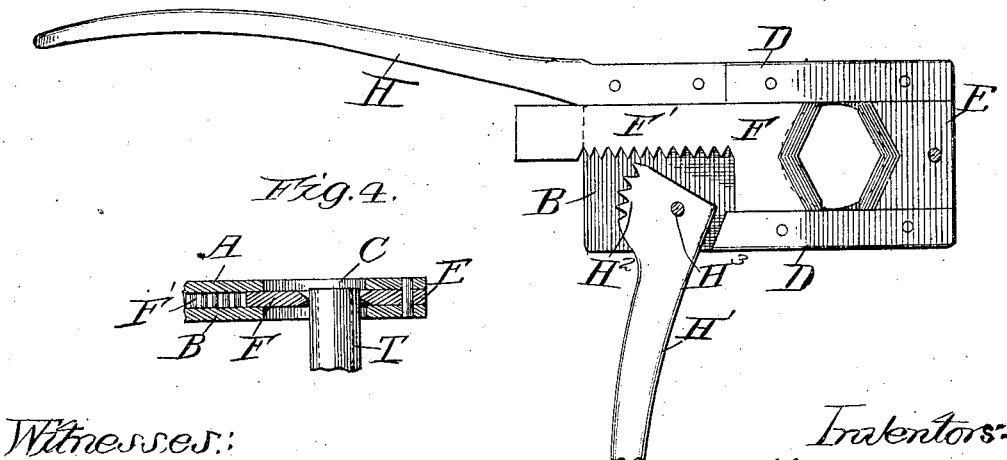

UNITED STATES PATENT OFFICE.

EMANUEL HAGSTROM AND GUSTAF HAGSTROM, OF LINDSBORG, KANSAS, ASSIGNORS TO HAGSTROM BROTHERS MANUFACTURING COMPANY, OF LINDSBORG, KANSAS, A CORPORATION OF KANSAS.

IMPLEMENT FOR SEVERING BRITTLE SUBSTANCES.

No. 880,878.   Specification of Letters Patent.   Patented March 3, 1908.

Application filed April 11, 1906. Serial No. 311,063.

*To all whom it may concern:*

Be it known that we, EMANUEL HAGSTROM and GUSTAF HAGSTROM, citizens of the United States of America, and residents of Lindsborg, McPherson county, State of Kansas, have invented certain new and useful Improvements in Implements for Severing Brittle Substances, of which the following is a specification.

Our invention relates to an improved implement for quickly severing hard and brittle substances, such as porcelain tubes, carbon sticks and the like and has for its object to provide a simply constructed implement whereby a plurality of minute fractures are simultaneously produced in circumferential alinement around the object at the point where it is to be severed.

In the accompanying drawings Figure 1 is a plan of the improved implement in closed position; Fig. 2 is a similar view with the top plate removed; Fig. 3 is a view similar to Fig. 2 but with the movable arm of the implement moved out far enough to free it from the movable fracturing blade; and Fig. 4 is a partial section line 4—4 showing a piece of porcelain tubing in position to have a short piece separated from its end.

The main body of the implement consists of a rectangular box forming the frame for carrying the fracturing blades made up of side plates A and B, and two edge pieces D secured between A and B by riveting or otherwise. A circular opening C through plates A and B serves to permit the tube which is to be severed to be placed in contact with the fracturing elements.

The fracturing elements consist of two V-shaped blades E and F between which the tube or bar is severed. The fracturing blade E is stationary, being held by a rivet passing through plates A and B, or in any other suitable means. The adjacent end edges of the blades are reversely V-shaped and with their edges uniformly wedge-shaped or with both sides diverging with uniform angles, so that an equal and uniform pressure is imparted to the material being fractured from all sides simultaneously as herewith described. The fracturing blade F is movable and is made to slide to and from the stationary fracturing blade in a guide way formed by the pieces A, B and D. The fracturing blade F has a projecting portion $F^1$ as shown, provided with rack teeth adapted to be engaged by gear teeth $H^2$ cut on a portion of the movable lever $H^1$. This lever $H^1$ is pivoted at $H^3$ between the plates A and B. The stationary lever, or rather arm, H, is rigidly secured between the plates A and B and serves as a backing for the projection $F^1$ when it is engaged by the teeth $H^2$.

In using the implements the lever $H^1$ is moved outward so as to draw the blade F away from the knife E so as to permit the body T to be inserted between the blades. By then pressing H and $H^1$ toward each other in the same way that ordinary pliers are used the desired piece will be severed. In the case of porcelain and other hard and brittle substances, there is not an actual cut in the ordinary sense of that word, but the blades come into contact with the porcelain at four points around the circumference and by applying pressure at these points, the material is caused to break with a uniformity and an evenness that corresponds closely to actual cutting.

The operating edges of the blades E—F being reversely V-shaped and also uniformly wedge-shaped contact with the round surface of the material to be severed at numerous points and in circumferential alinement, so that when pressure is applied a plurality of small spaced fractures are produced in a line around the object, which running together completely circumscribe the object and produce the desired results. The material is thus severed with a clean uniform cleavage at right angles to its axial lines and by reason of the uniform shape of the fracturing edges of the blades, the pressure is uniform at each side of the fracture line, consequently no powdering effect is produced upon the substances of the object. The action of the implement thus does not produce "ragged" edges at the severing point, and the material at each side of the fracture is left in a form.

It will be observed that by moving the lever $H^1$ outward, as shown in Fig. 3, the teeth $H^2$ may be made to clear the teeth on the projection $F^1$. In this position the projection of $F^1$ beyond the plates A and B permits the operator to adjust the movable blade inward or outward so that when the lever H¹ is again moved inward the teeth H² will engage the teeth on F¹ at a different position than before. By this means the movable blade F is adjusted so as to adapt the implements for use on larger or smaller bodies.

What we claim is:—

In a tool of the character described, a cutting blade having a beveled V-shaped cutting edge, and a second opposed cutting blade movable to and from the first, having a like cutting edge arranged in the same plane therewith.

Signed at Lindsborg, Kans., this 4th day of April, 1906.

EMANUEL HAGSTROM.
GUST. HAGSTROM.

Witnesses:
ALLEN WILBER,
EDWARD F. NELSON.